B. HOLLY.

Improvement in Automatic Regulating Valves.

No. 4,396. Reissued May 23, 1871.

Witnesses,
H. Campbell
J. A. Campbell.

Inventor
Burdsie Holly
by his attys
Mason, Fenwick & Lawrence

UNITED STATES PATENT OFFICE.

BIRDSILL HOLLY, OF LOCKPORT, NEW YORK.

IMPROVEMENT IN AUTOMATIC REGULATING-VALVES.

Specification forming part of Letters Patent No. 94,748, dated September 14, 1869; reissue No. 4,396, dated May 23, 1871.

*To all whom it may concern:*

Be it known that I, BIRDSILL HOLLY, of Lockport, in the county of Niagara and State of New York, have invented a new and Improved Automatic Regulating-Valve; and I do hereby declare that the following is a full, clear, and exact description thereof, reference being had to the accompanying drawing, making part of this specification, in which—

Figure 1:
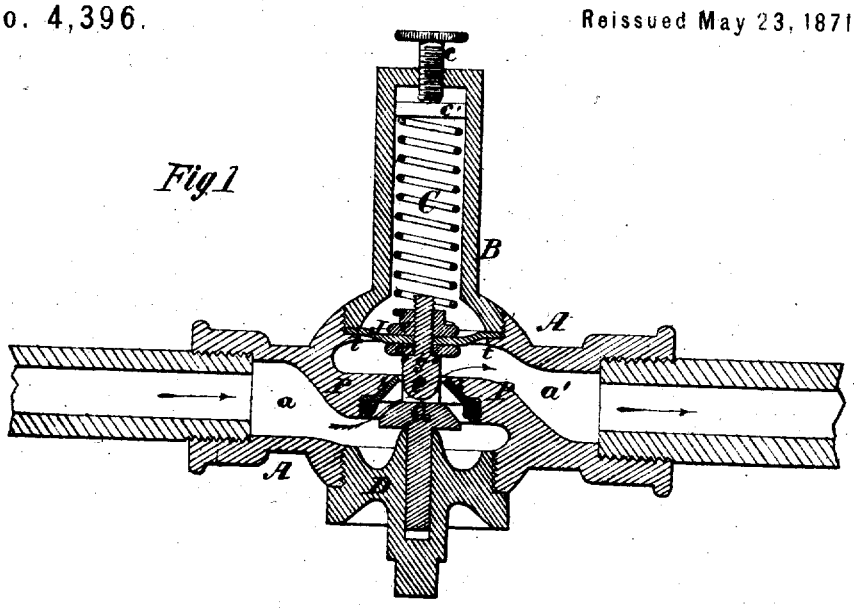
Figure 2:
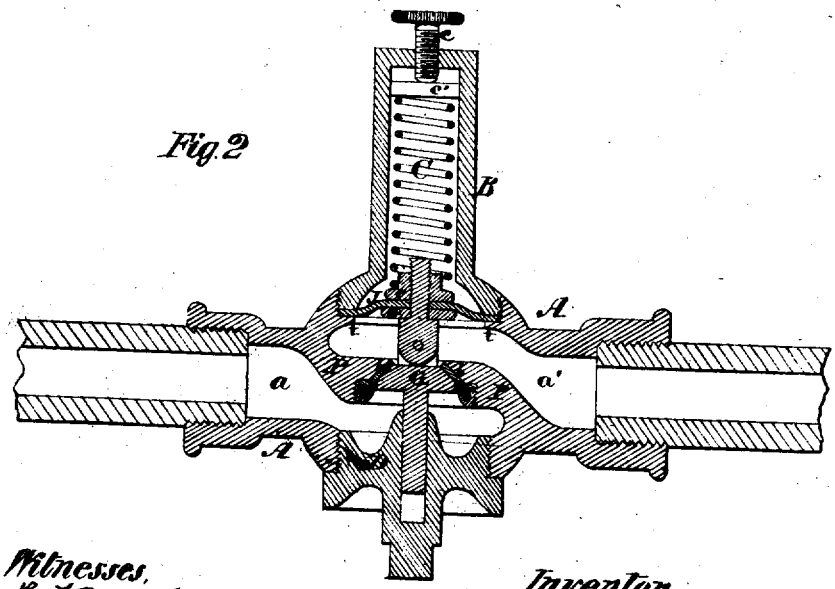

Figure 1 is a vertical section taken longitudinally through the center of the improved regulating-valve, open. Fig. 2 is a similar view of the same parts, showing the valves shut.

Similar letters of reference indicate corresponding parts in the two figures.

This invention relates to a new and improved automatic regulating-valve, which is applicable to the house service-pipes leading from street water-mains, under the old system of supplying cities with water from reservoirs, but which is more especially useful for such pipes, under my improved system of water-works described in my specification marked "Case A," wherein this pressure of water in the street-main is required to be very great at certain times.

The object of this invention is to prevent at all times an undue pressure of water in pipes leading into houses from street-mains; at the same time allow the pressure in the latter to be augmented to any degree desired, by the employment of an automatic regulator, which consists of a movable diaphragm, a cut-off valve, and an adjustable pressure-spring, so arranged and combined that the pressure of water, acting against the diaphragm, will have a tendency to shut the valve, and when such pressure is removed the power of the spring will operate to open this valve, as will be hereinafter explained.

To enable others skilled in the art to understand my invention, I will describe its construction and operation.

In the accompanying drawing, A represents the globular shell or body of the improved regulator, which shell is centrally divided by a partition, P, that forms the induction water-way *a*, and the eduction water-way *a'*. G is a valve, which is adapted for closing the communication between the water-ways *a a'*, and which is guided by having its stem fitted loosely into a top, D, screwed into the shell A beneath the valve-seat. This valve G is arranged so as to close upwardly against a seat which surrounds a passage made through the horizontal portion of the partition P, and which is lined with leather *b*, confined in place by a screw-ring, *o*. The leather lining *b* affords a packing which will make a durable and perfectly-tight joint, when the beveled surface of valve G is held up by pressure of water against a diaphragm, J, as indicated in Fig. 2. The valve G has ears formed on its upper surface, between which is pivoted, at *i*, a screw-stem, *g*, the threaded portion of which passes through a washer, *e'*. A flexible diaphragm, J, which presents a larger area of surface to the water than valve G, is thus confined between the portions *e e'*, so as not to leak around the screw-stem *g*, which connects the valve G to it. The circumferential edge of diaphragm J is confined tightly between an annular flange or shoulder, *p*, and an enlarged screw-threaded portion of a cap, B, so that water is not allowed to pass above the diaphragm into said cap. The cap B contains a helical spring, C, and a follower, *c'*, upon which a screw, *c*, bears, that is tapped through the top of the cap. The spring C acts downwardly upon the nut *e* with more or less pressure, as may be desired, which pressure has a tendency to keep valve G open, and can be increased or diminished at pleasure by adjusting the screw *c*.

*Operation.*

Suppose the pressure in the street-mains to be fifty pounds, and the valve G be adjusted, by means of screw *c*, to close at a pressure of sixty pounds, the diaphragm J being four or five times the area of the valve G, and so attached to this valve that any motion of the former has a tendency to open or close the latter. Now, suppose the valve to be arranged in its shell, so that the pressure of water after it has passed through the valve-opening will be between the valve and diaphragm; when the pressure in the mains has been raised to sixty pounds this pressure, acting upwardly against the diaphragm, will overcome the power of the spring C and close the valve, which will remain closed until the pressure against the diaphragm has been reduced, which will occur at any time while water is being drawn in the dwelling; and as soon as this flow is stopped the pressure against the diaphragm will at once close the valve, and not allow it to rise above sixty pounds' pressure.

By thus constructing and arranging a valve it will remain closed except when water is being drawn from the service-pipes to which it is applied, and cut off the pressure of water in the main from the service or house-pipes, thereby allowing any desired degree of pressure to be applied to the water in the mains without endangering the service-pipes.

Having described one practical mode of carrying my invention into effect, what I claim as new, and desire to secure by Letters Patent, is—

1. The shell or case A, constructed with a diaphragm, P, and provided with a spring-box, B, in combination with the flexible diaphragm J, a valve, G, and a connecting-stem, *g*, substantially as described.

2. The diaphragm J and valve G, connected together by a stem, *g*, and joint *i*, substantially as described.

3. The adjusting-screw *c*, spring C; diaphragm J, partition P, and valve G, constructed and combined substantially as described.

BIRDSILL HOLLY.

Witnesses:
C. G. HILDRETH,
H. H. FLAGLER.